United States Patent [19]

West

[11] Patent Number: 4,850,433
[45] Date of Patent: Jul. 25, 1989

[54] LANDSCAPE CONDITIONING ASSEMBLY

[76] Inventor: Harry W. West, P.O. Box 10, Sturgis, Mich. 49091

[21] Appl. No.: 222,294

[22] Filed: Jul. 20, 1988

Related U.S. Application Data

[63] Continuation of Ser. No. 891,903, Aug. 1, 1986.

[51] Int. Cl.[4] ............................................. A01B 31/00
[52] U.S. Cl. .................................... 172/32; 172/684.5
[58] Field of Search ................. 171/2, 10, 12, 14, 15, 171/18, 43, 50, 52, 64, 67, 84, 88, 104, 111, 132, 137, 140, 141, 143; 172/32, 611, 684.5, 701.1, 701.3, 250, 251, 253, 777, 786, 787, 791, 445.1, 445.2, 446, 476, 799.5

[56] References Cited

U.S. PATENT DOCUMENTS

| | | | |
|---|---|---|---|
| 1,233,008 | 7/1917 | York | 171/111 |
| 1,247,416 | 11/1917 | Leak | 172/684.5 |
| 1,291,594 | 1/1919 | Monroe | 172/684.5 |
| 1,459,122 | 6/1923 | Van Vickle | 172/685 |
| 1,509,189 | 9/1924 | Carlson | 172/684.5 |
| 1,755,631 | 4/1930 | Burnett | 172/776 |
| 1,865,812 | 7/1932 | Anderson | 172/684.5 |
| 2,104,675 | 1/1938 | Ruff | 172/684.5 |
| 2,749,630 | 6/1956 | Nave | 172/821 |
| 2,774,155 | 12/1956 | Hipp | 172/253 X |
| 3,263,755 | 8/1966 | Zink | 171/63 |
| 3,276,153 | 10/1966 | Sorensen | 172/611 X |
| 3,523,380 | 8/1970 | Bolyard et al. | 172/684.5 X |
| 4,320,988 | 3/1982 | Seal | 172/445.1 |
| 4,572,301 | 2/1986 | Bourgeois | 172/684.5 X |
| 4,655,297 | 4/1987 | Bourgeois | 172/445.1 |

FOREIGN PATENT DOCUMENTS

| | | | |
|---|---|---|---|
| 713708 | 8/1950 | Denmark | 172/684.5 |
| 1493388 | 11/1977 | United Kingdom | 171/67 |

Primary Examiner—James R. Feyrer
Attorney, Agent, or Firm—Reising, Ethington, Barnard, Perry & Milton

[57] ABSTRACT

The invention relates to a landscape conditioning assembly for use in grooming and cleaning dirt and grass sufaces, such as a baseball field. The assembly includes frame means (12) defining a plane to be moved over the landscape. The frame means (12) includes first and second side rails (14, 16) and first and second crossbar supports (18, 20) extending therebetween. First and second cutting blades (26, 28) extend between the first and second side rails (14, 16) and are adjustably mounted to the first and second crossbar supports (18, 20) by adjustment means for selectively adjusting the distance the first and second cutting edges (34, 36) extend below the plane to establish any one of various depths of cut. The assembly also includes a fixed cutting blade (44) which extends between the first and second side rails (14) and is fixedly secured thereto ahead of the adjustable cutting blades.

10 Claims, 3 Drawing Sheets

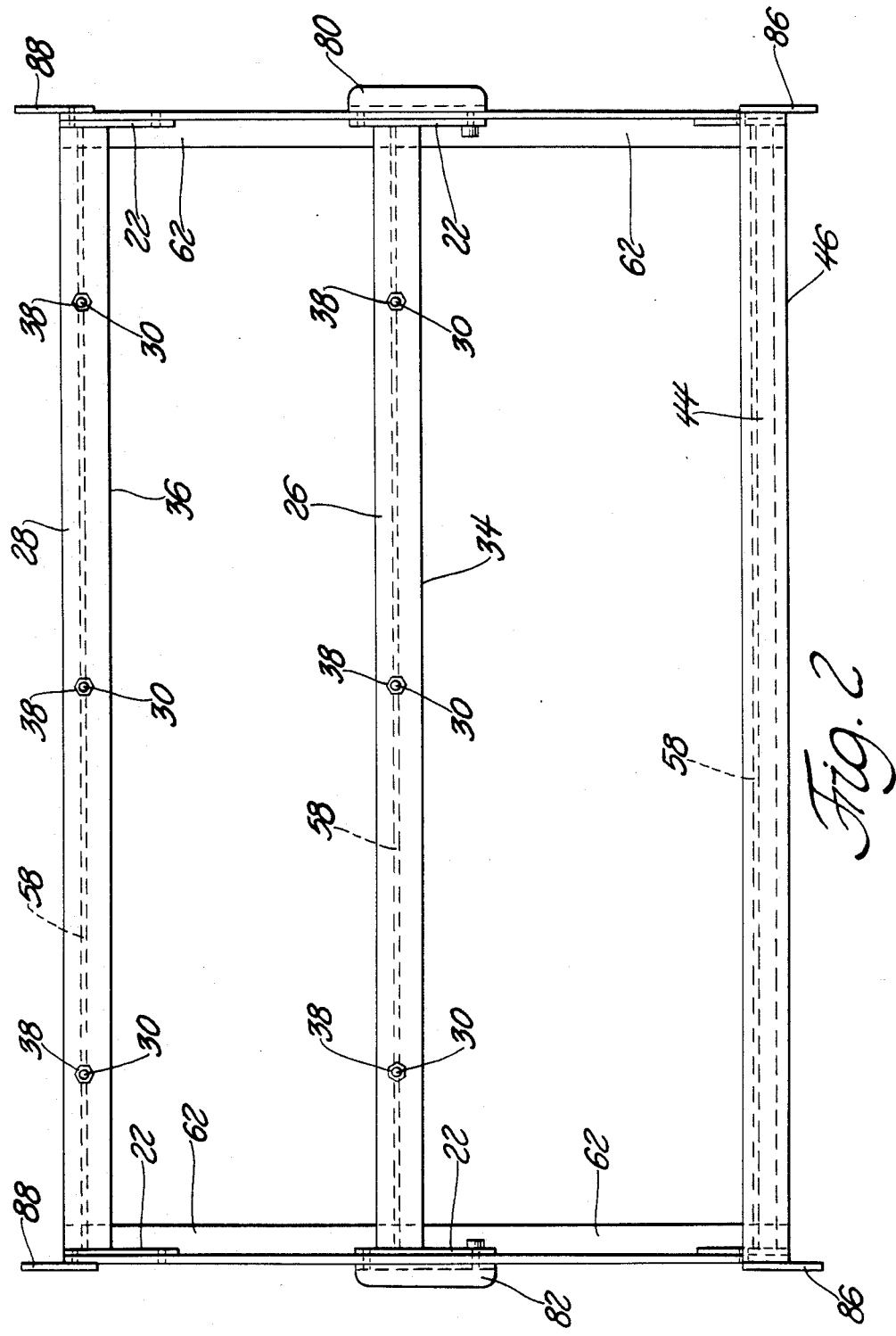

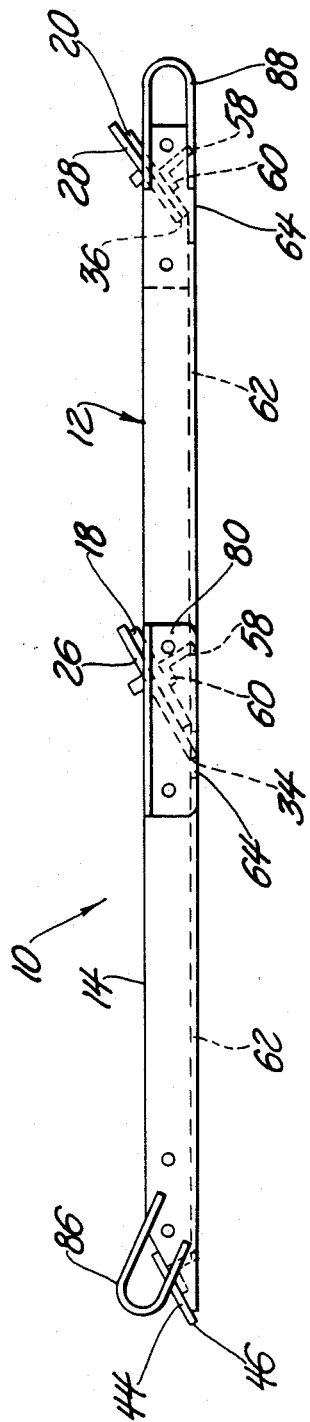

LANDSCAPE CONDITIONING ASSEMBLY

This application is a continuation of application Ser. No. 891,903, filed Aug. 1, 1986, now abandoned.

BACKGROUND OF THE INVENTION (1) Technical Field

The subject invention relates to a landscape conditioning assembly for use in grooming the landscape of a turf or dirt surface, such as a baseball field.

(2) Description of the Prior Art

When a dirt or turf surface is to be cleaned and groomed one of the most effective ways to perform these functions is to employ a landscape conditioning assembly dragged behind a vehicle. These assemblies usually include a frame, and a plurality of cutting blades mounted to the frame which are used to cut, clean, dry and groom the surface to be conditioned.

There are assemblies known in the prior art which include frames on which blades are mounted and which are dragged over a surface to be groomed. For example, U.S. Pat. No. 1,233,008 issued to York on July 10, 1917 discloses a road scraper and stone remover including blades attached to a platform member. The assembly also includes loose chains which direct large stones to one side and rakes which also collect and then discharge smaller stones to one side.

U.S. Pat. No. 1,865,812 issued to Anderson on July 5, 1932 discloses a road maintenance machine including a frame for supporting three blades. Each blade performs a slightly different function. For example, the first blade smooths ruts and passes dirt, rocks and other material to one side. The second blade cuts down any obstacle or risers that the first blade has missed. This blade also directs dirt, rocks and other material to one side. Finally, the third blade further distributes dirt, rocks and other material to one side and smooths the road.

U.S. Pat. No. 1,459,122 issued to Van Vickle on June 19, 1923 and U.S. Pat. No. 1,578,011 issued to Calkins on Mar. 23, 1926 disclose road drags that include frames as well as a plurality of blades which may be adjusted to be inclined at different angles with respect to the road surface. In addition, U.S. Pat. 3,263,755 issued to Zink on Aug. 2, 1966 discloses a pebble catch including a metal rink dragnet and a pebble catcher mounted in the rear of the dragnet.

All of the above-mentioned assemblies are representative of landscape conditioning assemblies employed to groom, clean and condition a landscape surface. However, none of the inventions disclosed in the prior art show assemblies which include cutting blades which are adjustably mounted to a frame.

SUMMARY OF THE INVENTION AND ADVANTAGES

The subject invention is related to a landscape conditioning assembly for grooming the landscape of a turf or dirt surface including a frame means defining a plane to be moved over the landscape. The assembly also includes a first cutting blade extending laterally across the frame means for presenting a first cutting edge to engage the landscape. The assembly is characterized by first adjustment means adjustably mounting the first cutting blade to the frame means for selectively adjusting the distance the first cutting edge extends below the plane to establish any one of various depths of cut. The subject invention provides an improved landscape conditioning assembly which includes adjustably mounted cutting blades which provide better cutting, drying, packing, cleaning and grooming of athletic fields, race tracks, lawns and the like.

BRIEF DESCRIPTION OF THE DRAWING

FIG. 2 is a top view of the assembly.

FIG. 3 is a side view of the assembly.

DESCRIPTION OF THE PREFERRED EMBODIMENT

Figure 1:
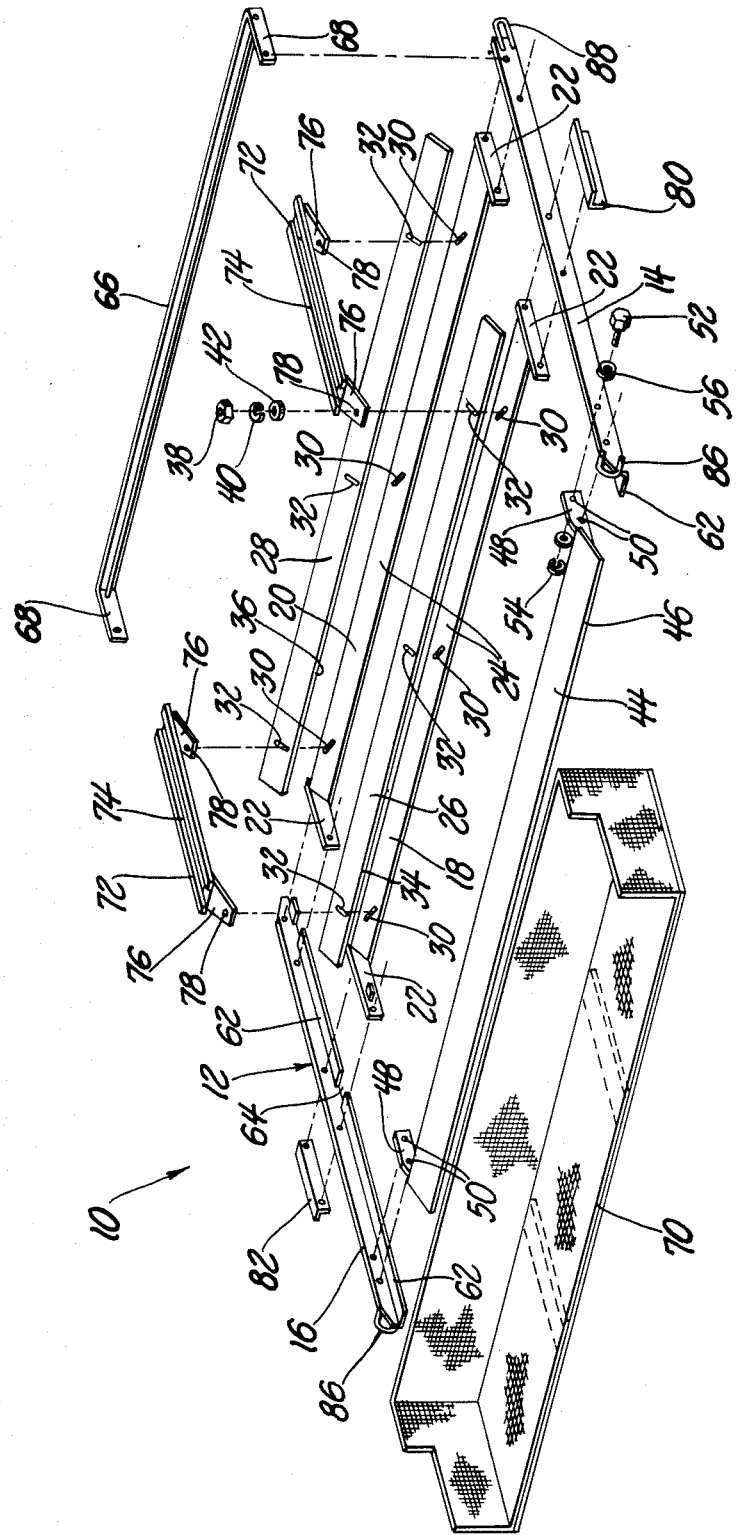
FIG. 1 is an exploded perspective view of all the component parts of the assembly.

A landscape conditioning assembly for grooming and cleaning dirt and turf surfaces is generally shown at 10. The assembly 10 includes a frame means indicated at 12. The frame means 12 includes first and second side rails 14 and 16 respectively and first and second crossbar supports 18 and 20 respectively extending laterally across the frame means 12 and between the first and second side rails 14 and 16 and fixedly secured thereto. Each crossbar support 18 and 20 includes a pair of ears 22 and a beam 24 extending between the ears 22. The beam 24 is a rectangular plate of steel which is welded to the ears 22 but which may be attached to the ears by any suitable means, e.g., bolts. The ears 22 are adapted for mounting the crossbar supports 18 and 20 to the frame means 12 by bolts, nuts and lock washers or any other suitable fastening means. Together, the first and second side rails 14 and 16 and the first and second crossbar supports 18 and 20 of the frame means 12 define a plane to be moved over the landscape.

The assembly 10 further includes first and second cutting blades 26 and 28 extending laterally across the frame means 12 for presenting a first and second cutting edge 24 and 36 respectively to engage the landscape. The cutting blades 26 and 28 are adjustably mounted to the first and second crossbar supports 18 and 20 by first and second adjustment means. The cutting blades 26 and 28 are preferably made of flat rectangular steel bars which lay flush on the beam 24 of the crossbar supports 18 and 20. The beam 24 present a mounting surface which is inclined at an angle with respect to the plane of the frame means 12. The first and second adjustment means adjustably mounts the cutting blades 26 and 28 to the frame means 12 for selectively adjusting the distance the first and second cutting edges 24 and 36 extend below the plane to establish any one of various depths of cut. The adjustment means include blade mounting posts 30 disposed on the beam 24 of the crossbar supports 18 and 20 and alignment slots 32 disposed on the first and second cutting blades 26 and 28. The blade mounting posts 30 and alignment slots 32 are disposed relative to each other such that the first and second cutting blades 26 and 28 may be adjustably mounted to the first and second crossbar supports 18 and 20 such that the distance of the first and second cutting edges 34 and 36 extend below the plane may be selectively adjusted to achieve various depths of cut. More specifically, the longitudinal axis of the blade mounting posts 30 and the alignment slots 32 are disposed in intersecting relationship with respect to each other. The nuts 38 are employed in conjunction with lock washers 40 and flatwashers 42 to securely mount the cutting blades 26 and 28 to the crossbar supports 18 and 20.

The posts 30 are threaded and extend through the blade alignment slots 32 and thereby allow the first and second cutting blades 26 and 28 to move or adjust along the direction of the longitudinal axis of the alignment slots 32. In this way, the distance the first and second cutting edges 34 and 36 extend below the plane established by the frame means 12 may be selectively adjusted to achieve any one of various depths of cut.

The assembly 10 also includes a fixed cutting blade 44 extending laterally across the frame means 12 for presenting a third cutting edge 46 to engage the landscape. The fixed cutting blade 44 extends between the first and second side rails 14 and 16 and includes flanges 48 with bolt holes 50. The fixed cutting blade 44 is fixedly secured to the frame means 12 by fasteners 52, nuts 54 and washers 56 at the side rails 14 and 16. The first and second crossbar supports 18 and 20 are disposed in spaced relationship with respect to each other and also with respect to the fixed cutting blade 44. Further, the fixed cutting blade 44 is disposed at a first position preceding the first and second cutting blades 26, 28 to knock down soft dirt mounts and fold over grass. Said another way, as the assembly is moved over the landscape, the fixed cutting blade 44 is the first blade to engage the surface to be groomed. The fixed cutting blade 44 and the first and second crossbar supports 18 and 20 also include a downwardly extending packing portion 58 disposed on the underside thereof for packing dirt that passes either over or under the cutting blades 26, 28 and 44. The packing portion 58 extends along the longitudinal axis of the fixed cutting blade 44 and crossbar supports 18 and 20 and includes a mounting portion 60 which is mounted in flush engagement with the underside of the fixed cutting blade 44 and the crossbar supports 18 and 20 by any suitable means such as welding. The packing portion 58 also adds support to the fixed cutting blade 44 and the first and second crossbar supports 18 and 20 thereby preventing the members from being permanently bent. In addition, the first and second side rails include inwardly extending ledges 62 disposed along the inward edges of the rails 14 and 16 and parallel to the plane defined by the frame means 12. The ledges 62 are interrupted at predetermined points to present gaps 64 to facilitate the extension of the cutting blades 26 and 28 therethrough and below the plane defined by the frame means 12.

First and second side rail bumper guards 80 and 82 are movably secured to the first and second side rails 14 and 16 respectively on the outside of the side rails 14 and 16 directly opposite the first crossbar supports 18. The side rail bumper guards 80 and 82 prevent the frame means 12 from becoming snagged on fences, and the like. The side rail bumper guards 80, 82 are preferably rectangular metal members bent at right angles along the longitudinal axis of the members. The guards 80, 82 are fastened at both ends to the frame means 12 by the bolts, nuts and lock washers used to securely fasten the first crossbar support 18 to the frame means 12. The bumper guards 80, 82 include rounded edges which slide off when engaging an obstruction and thereby keep the assembly from becoming entangled in the obstruction. Further, the bumper guards 80, 82 serve as handles enabling the operator to lift the assembly when desired and provide added support for the frame 12 at the gaps 64.

The subject invention is very versatile and includes a number of additional and interchangeable attachments which may be added or substituted for other parts to produce various desired results during the grooming process. For example, the assembly may be employed with a spreader bar 66 which may be interchangeably disposed in place of the second cutting blade 28 and a second crossbar support 20. Like the second crossbar support 20, the spreader bar extends between the first and second side rails 14 and 16 and includes mounting portions 68 adapted for mounting the spreader bar 66 to the frame means 12. The spreader bar 66 may be employed for spreading and smoothing the dirt. Further, the assembly may include a chain link fence (not shown) of similar width as that of the frame means 12 disposed either at the front or the rear of the frame means 12 for providing further smoothing and spreading of the dirt. A stone receptacle means 70 may be disposed between the cutting blades 44, 26 and the spreader bar 66 for receiving material which passes over the cutting blades 44, 28, 26 and for allowing material made up of elements smaller than a predetermined size to pass through the receptacle means 70 while retaining larger sized therein. The receptacle means 70 includes a wire mesh basket which extends between the first and second side rails 14 and 16 and, depending upon where it is positioned, between any two cutting blades 44 and 26, or between the first cutting blade 26 and the spreader bar 66. When the stone receptacle mans 70 is positioned between the first cutting blade 26 and the spreader bar 66, the spreader bar 66 acts to support the receptacle means 70 especially when the assembly is being moved over an uphill grade. The stone receptacle means 70 may be disposed in the spaces between any two cutting blades 44 and 26, 28 and spreader bar 66 to catch and retain those stones, and other undesired materials which have been scooped up and passed over a cutting blade 26 or 44 and which are too large to pass through the wire mesh of the stone receptacle means. Any size mesh may be used depending on the desired thoroughness of the cleaning. Further, when the assembly is employed on turf, the cleaning process may be augmented by attaching the fence in front of the frame means and dragging the fence over the turf. This loosens unwanted debris from low nesting places and forces the unwanted material to the top of the turf. The cutting blades 44 and 26 are then better able to scoop the debris for cleaning by the stone receptacle means 70.

The assembly may also include weight support means 72 which are fastened to and extend between the first and second crossbar supports 18 and 20 parallel to the side rails 14 and 16. The weight support means 72 may be employed for optionally supporting additional weight used in those circumstances where the surface to be groomed requires it. Each weight support means 72 includes a support surface 74 on which additional weight in the form of logs, planks, cement blocks, or the like may rest. The weight support means 72 also include tongues 76 equipped with mounting holes 78 to facilitate mounting the weight support means 22 to the first and second crossbar supports 18 and 72 at the adjustment means. The assembly 10 also includes drag loops 86 disposed at the forward end of each side rail 14 and 16. Cables, chains, ropes, or the like, run from the pulling vehicle to the frame means 12 and are attached to the frame means 12 at the drag loops 86. Further, there are hooks 88 disposed at the rearward end of each side rail support 14 and 16. The hooks 88 may be used to attach another grooming tool such as a chain link fence, another landscape condition assembly or the like.

In its operative mode, the landscape conditioning assembly is dragged behind a vehicle over the surface to be groomed. The blades cut into the surface of the field, displacing and removing dirt and rocks to achieve the desired texture, grading and contour of the groomed surface. The device also facilitates the drying of a wet field by exposing wet soil to the air, and by mixing wet soil with dry soil during the grooming process. In its best mode, the subject invention employs a fixed cutting blade 44 disposed at a 30° angle with respect to the plane defined by the frame means 12. The first cutting blade 26 is also disposed at a 30° angle with respect to the plane. The second cutting blade is disposed at a 35° angle with respect to the plane. Each of the first and second cutting edges 34 and 36 of the first and second cutting blades 26 and 28 respectively are adjustable to approximately one inch below the plane defined by the frame means 12. Further, each cutting blade 26, 28, 44 performs a different distinct function which facilitates the grooming and cleaning process. For example, the fixed cutting blade 44 is employed to knock down any large clumps of dirt or other obstructions and also aids in the drying process by mixing wet dirt with dry dirt as it engages the surface to be groomed. The first cutting blade 26 will produce a fine cut and is employed to bearly shave the top of the landscaped surface. In addition, the first cutting blade 26 cuts and carries dirt and other material and deposits it in low areas which commonly occur in baseball and softball fields, or the like. The second cutting blade 28 insures a thoroughness in cutting, leaving a smooth surface. In addition, throughout this process, the downwardly extending packing portion 58 located on the fixed cutting blade 44 and the first and second cutting blades 26 and 28 will pack the dirt of the surface to be groomed.

The subject invention provides a landscape conditioning assembly which grooms and cleans the surface more effectively and efficiently than those devices known in the prior art. Further, the invention has been described in an illustrative manner and it is to be understood that the terminology which has been used is intended to be in the nature of words of description rather than limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A landscape conditioning assembly for grooming the landscape of a soil surface, said assembly comprising; a frame means (12) defining a plane to be moved over the soil, said frame means (12) including first and second side support rails (14, 16) and first and second cross bar supports (18, 20) extending laterally across said frame means (12) and between said first and second side rails (14, 16) and fixedly secured thereto, said first and second cross bar supports (18, 20) disposed in spaced parallel relationship with respect to each other and spacing said first and second side rails (14, 16) so as to define said plane, a first cutting blade (26) extending laterally across said frame means (12) inclined relative to said plane for presenting a first cutting edge (34) to engage the surface, said assembly characterized by first adjustment means adjustably mounting said first cutting blade (26) to said first cross support (18) for selectively adjusting the distance said first cutting edge (34) extends realative to said plane to establish any one of various depths of cut, said first cross bar support (18) including a packing portion (58) disposed on the underside thereof and inclined downwardly relative to said plane so as to be positioned for engagement with the surface for packing soil as said assembly is moved over the soil surface, said frame including side rail bumper guard (80,82) secured intermediate the ends of each first and second side rail (14, 16) for providing additional support to said side rails (14, 16) and for preventing said frame (12) from becoming snagged on fences and the like.

2. An assembly as set forth in claim 1 further characterized by said assembly including a second cutting blade (28) extending laterally across said frame means (12) for presenting a second cutting edge (36) to engage the soil and including second adjustment means adjustably mounting said second cutting blade (26) to said second cross bar support (20) for selectively adjusting the distance said second cutting edge (34) extends beneath said plane to establish any one of various depths of cut.

3. An assembly as set forth in claim 2 further characterized by said assembly including a fixed cutting blade (44) extending laterally across said frame means (12) and fixedly secured thereto for presenting a third cutting edge (46) to engage the soil.

4. An assembly as set forth in claim 3 further characterized by said fixed cutting blade (44) disposed at a first position preceding said first and second cutting blades (26,28) and in spaced relationship with respect to said first cutting blade (26).

5. An assembly as set forth in claim 4 further characterized by said first and second adjustment means including blade-mounting posts (30) disposed on said crossbar supports (18, 20) and alignment slots (32) disposed on said first and second cutting blades (26, 28), said blade-mounting (30) posts and said alignment slots (32) disposed relative to each other such that said first and second cutting blades (26, 28) may be adjustably mounted to said first and second crossbar supports (18, 20) such that the distance said first and second cutting edges (26, 38) extend below said plane may be selectively adjusted to achieve various depths of cut.

6. An assembly as set forth in claim 5, further characterized by said fixed cutting blade (44) and said second cross bar support (20) including a downwardly extending packing portion (58) disposed on the underside thereof for packing soil as said assembly is moved over a soil surface.

7. An assembly as set forth in claim 6 further characterized by said assembly including a stone receptacle means (70) disposed between said cutting blades (44, 26) and said spreader bar (66) for receiving material which passes over said cutting blades (44, 26) and said spreader bar (66) and for allowing material made up of elements smaller than a predetermined size to pass through said receptacle (70) while retaining larger sizes therein.

8. An assembly as set forth in claim 7 further characterized by said assembly including weight support means (72) extending between said first and second cutting blades and parallel to said side rails (14, 16) for supporting additional weight.

9. An assembly as set forth in claim 8 further characterized by said crossbar support (18, 20 including a pair of ears (22) and a beam (24) mounted to and extending between said pair of ears (22), said ears (22) being adapted for mounting said crossbar supports (18,20) to said frame means (12), said beam (24) presenting a mounting surface (24) inclined at an angle with respect to said plane of said frame means (12).

10. An assembly as set forth in claim 9 further characterized by, said side rails (14,16) including inwardly extending ledges (62) disposed along said rails (14,16) and parallel to said plane of said frame means (12), said ledges (62) interrupted at predetermined points to present gaps (64) to facilitate the extension of said cutting blade (26) therethrough and below said plane of said frame means (12).

* * * * *